United States Patent
Holle et al.

(10) Patent No.: US 8,564,149 B2
(45) Date of Patent: Oct. 22, 2013

(54) WAVE POWER PLANT AND METHOD FOR OPERATING THE SAME

(75) Inventors: Michael Holle, Sohnstetten (DE); Janet Lees, Glasgow (GB)

(73) Assignee: Voith Patent GmbH, Heidenheim (DE)

( * ) Notice: Subject to any disclaimer, the term of this patent is extended or adjusted under 35 U.S.C. 154(b) by 476 days.

(21) Appl. No.: 12/736,361

(22) PCT Filed: May 6, 2009

(86) PCT No.: PCT/EP2009/003227
§ 371 (c)(1),
(2), (4) Date: Dec. 27, 2010

(87) PCT Pub. No.: WO2009/135655
PCT Pub. Date: Nov. 12, 2009

(65) Prior Publication Data
US 2011/0101696 A1    May 5, 2011

(30) Foreign Application Priority Data
May 9, 2008    (DE) .......................... 10 2008 023 048

(51) Int. Cl.
*F03B 13/24*    (2006.01)

(52) U.S. Cl.
USPC ............................................. 290/53; 290/42

(58) Field of Classification Search
USPC ........................................................ 290/53
See application file for complete search history.

(56) References Cited

U.S. PATENT DOCUMENTS

| | | | | |
|---|---|---|---|---|
| 4,260,901 A | * | 4/1981 | Woodbridge | ................... 290/42 |
| 5,027,000 A | | 6/1991 | Chino | |
| 5,186,822 A | * | 2/1993 | Tzong et al. | .................. 210/122 |
| 5,191,225 A | | 3/1993 | Wells | |
| 6,731,019 B2 | * | 5/2004 | Burns et al. | ..................... 290/42 |
| 6,765,307 B2 | * | 7/2004 | Gerber et al. | .................. 290/42 |
| 6,936,994 B1 | | 8/2005 | Gimlan | |

(Continued)

FOREIGN PATENT DOCUMENTS

| | | |
|---|---|---|
| DE | 2617023 A1 | 10/1977 |
| DE | 2934288 A1 | 3/1981 |

(Continued)

OTHER PUBLICATIONS

Childs, J. F., "The Role of Converters and their Control in the Recovery of Wave Energy" (Jun. 16, 1997).

(Continued)

*Primary Examiner* — Michael Zarroli
(74) *Attorney, Agent, or Firm* — Farjami & Farjami LLP

(57) ABSTRACT

A method for operating a wave power plant, where the method supplying, using a electrical generator, electrical power to a power grid, which is averaged over a plurality of flow oscillation periods using a generator side converter, a direct current link and a network side converter, where an electrical energy storage is connected to the direct current link using a DC converter, and maintaining the voltage value of the direct current link between a lower limiting voltage and an upper limiting voltage by at least one of a closed-loop and an open-loop control of a power input and a power output, wherein an air turbine is speed guided, depending on a variable, which characterises the flow in at least one of the flow channel and the pressure in the wave chamber, wherein the rotational speed is guided continuously during a flow oscillation period.

10 Claims, 2 Drawing Sheets

(56) References Cited

U.S. PATENT DOCUMENTS

| | | | | |
|---|---|---|---|---|
| 7,804,184 | B2* | 9/2010 | Yuan et al. | 290/44 |
| 7,980,832 | B2* | 7/2011 | Ahdoot | 417/333 |
| 8,390,139 | B2* | 3/2013 | Fortmann | 290/44 |

FOREIGN PATENT DOCUMENTS

| DE | 3401273 A1 | 7/1985 |
|---|---|---|
| WO | WO 9951877 A1 | 10/1999 |
| WO | WO 2005045243 A1 | 5/2005 |

OTHER PUBLICATIONS

Folley, et al, "Comparison of LIMPET contra-rotating wells turbine with theoretical and model test predictions" Ocean Engineering, Elmsford, NY, US, Bd. 33, Nr. 8-9, (Jun. 1, 2006).

Brooking, et al, "Power conditioning of the output from a linear vernier hybrid permanent magnet generator for use in direct drive wave energy converters" IEE Proceedings: Generation, Transmission and Distribution, Institution of Electrical Engineers, GB, Bd. 152, Nr. 5, (Sep. 9, 2005).

* cited by examiner

WAVE POWER PLANT AND METHOD FOR OPERATING THE SAME

This is a U.S. national phase application which is based on, and claims priority from, PCT application Serial No. PCT/EP2009/003227, filed May 6, 2009, which claims priority from foreign application Serial No. 102008023048.0, filed May 9, 2008, in Germany.

BACKGROUND

The invention concerns a method for operating a wave power plant, in particular an oscillating-wave-column wave power plant, as well as a method for operating the same.

Wave power plants operating according to the oscillating wave column (OWC) principle are known. As an example reference is made to document U.S. Pat. No. 5,191,225. To do so, a wave chamber is used, wherein the water surface goes up and down according to the cycle of the waves. For that purpose, an access opening is arranged below the water surface for the entry of waves surging against the wave chamber. An air volume, situated in the wave chamber, is periodically put under pressure by the movement of the water surface, so that an oscillating air current is generated in a flow channel leading to the exterior. An air turbine is arranged in this flow channel, which typically rotates in a single direction for an incident air flow received from opposite directions, wherein in particular a Wells turbine comes into consideration.

Operating an electrical generator, using an air turbine of an OWC-wave power plant, rotating in a single direction, when receiving an incident air flow from opposite directions, raises the problem that due to the oscillation of the airflow in the flow channel originating from the wave chamber, the flow velocity significantly varies over an oscillation period. Additionally, stochastic fluctuations in the flow velocity do occur. This causes the turbine blades to stall, in particular for operating conditions with insufficient rotational speed of the air turbine and a high flow coefficient stalling occurs, which is accompanied by a strong power drop as well as high noise generation. Therefore, the aforementioned document U.S. Pat. No. 5,191,225 suggested to provide a runner of an air turbine with a large gyrating mass. Bringing such a runner to a high nominal rotation speed enables to operate the air turbine permanently with a low flow coefficient and hence reliably prevent it from stalling. Moreover, the high moment of inertia of the runner causes smoothing of the mechanical power transmitted to the electrical generator. The shortcoming of a runner with large gyrating mass is however that it cannot be driven under optimum power conditions over a wide operating range and that high ventilation losses may occur.

An alternative arrangement for operating an air turbine for an OWV-wave power plant consists in adapting the braking torque, applied by the electrical generator to the runner of the air turbine, in accordance with an averaged pressure in the wave chamber and moreover limiting braking torque to avoid stalling. Such an averaged adjustment of the braking torque, applied by the electrical generator, is possible in particular for electrical machines, operated with a frequency inverter. If the torque generated by the air turbine exceeds the braking torque of the electrical generator, the runner of the air turbine will be accelerated and consequently the flow coefficient is reduced. If the limitation of the braking torque of the electrical generator is adapted to the maximum flow velocities, occurring in the flow channel, the stalling behaviour can be improved. However, there is still the shortcoming that the air turbine does not reach its power optimum over wide operating ranges.

A frequency inverter with an integrated direct current link can be used for supplying electric power from an electrical generator, which is operated with variable rotational speed, to a power grid with constant frequency. A corresponding grid connection of variable speed wind power turbines with a synchronous generator is known. The energy storages used for this application enable a certain degree of smoothing of the power fed in a power grid, but they are inappropriate to prevent a pulsing power feed of a generic wave power plant. As regards the grid connection, reference is made to the scientific article CHILDS J. F "The role of converters and their control in the recovery of wave energy", 19970616, 16 Jun. 1997 (1997-06-16), pages 3/1-3/7.

SUMMARY

The object of the invention is to provide a device for operating a wave power plant, which extensively prevents the occurrence of stalling of the air turbine and simultaneously taps as much power as possible from the airflow. Furthermore, a wave power plant should be provided, which is designed in such a way that the aforementioned operation may be conducted without the occurrence of stalling and extensively under optimum power conditions along with a high network compatibility.

The operating method according to the invention as well as the wave power plant according to the invention are characterised by the features of the independent claims. Consequently, the inventors have recognised that a speed guidance of the air turbine can be realised based on a variable, which characterises the incident flow conditions for securing an operation without any stalling and under optimum power conditions, if the electrical generator is connected with a power grid by the means of a direct current link with a sufficiently sized energy storage, to prevent any pulsing power flow to the power grid. An energy storage, as regards its storage capacity and its reaction rate, is presently connected with the direct current link such that the fluctuation range of the power fed in the power grid in the course of a flow oscillation period in the flow channel is limited and preferably a power value averaged over several flow oscillation periods is generated.

The interposition of a generator side converter of a direct current link and a network side converter between the electrical generator, which is driven at least indirectly by the air turbine, and the power grid to which electric power is fed, enables on the one hand the aforementioned operation without grid perturbation as well as an adapted idle power generation, on the other hand the air turbine can be driven over the whole flow oscillation period, including the various stochastic fluctuations of the incident flow velocity, with a rotational speed attributed to an optimum power input. Accordingly, the dynamic of the electric power generation and the resulting reaction on the mechanical power pick-up device can be adapted to the dynamic of the quickly varying pneumatic system, to enable an operation as close as possible to the optimal flow coefficient. To this, the braking torque applied by the electrical generator is varied during the flow oscillation period. To do so, a characteristic based open-loop control or closed-loop control can be taken into consideration. Besides, for an advantageous embodiment the electrical generator is driven as a motor for certain operating conditions to improve the optimal speed guidance of the air turbine. For these motorised operation sequences electrical power is preferably taken from the direct current link, wherein the energy storage connected with the direct current link serves as power feed so that any fallback on the power grid is prevented or at least limited.

Additionally, a preferred wave power plant according to the invention comprises a device for guiding the speed of the air turbine, by processing a variable, characterising the flow in the flow channel and/or the pressure in the wave chamber, for realising the speed guidance of the air turbine. To this, flow velocity measuring devices in the flow channel or pressure sensors in the wave chamber can be used. Alternately, the device for speed guidance may be model-based or uses merged sensor data. To simplify the speed guidance, the runner and the rotating shaft of the air turbine should have a small moment of inertia, so that preferably light materials, such as aluminium or hollow structures made of composite materials, for instance with carbon fibres, are applied.

Electrical energy storages, in particular high-power capacitors (supercaps) are preferred as energy storages. Additionally or alternately, energy can be stored in mechanical form. An example thereof is a flywheel storage or a pressure storage of a pneumatic or hydraulic system. According to the invention, the electrical energy storage is connected to the direct current link by means of a DC converter. Hereby, the voltage of the direct current link can be maintained within a narrow voltage band, which allows simplifying the generator side converter and the network side converter from the viewpoint of control and design engineering. Besides, it is possible for such an arrangement to use the storage capacity of the high-power capacitors in a wider range, which also provides a simplification on the storage side inasmuch as a larger energy reserve.

Additionally, the wave power plant according to the invention prefers a control device, which processes sensor data for determining the flow characteristic in the flow channel and/or the pressure in the wave chamber. This control device is also used for guiding the speed of the air turbine and comprises an integrated controller, used for a closed-loop control of the generator side converter and the network side converter of the direct current link as well as for controlling the power input and output of the energy storage.

BRIEF DESCRIPTION OF THE DRAWINGS

The invention will be described in further detail, thereby referring to preferred exemplary embodiments and the accompanied figures, which show the following.

DETAILED DESCRIPTION

Figure 1:
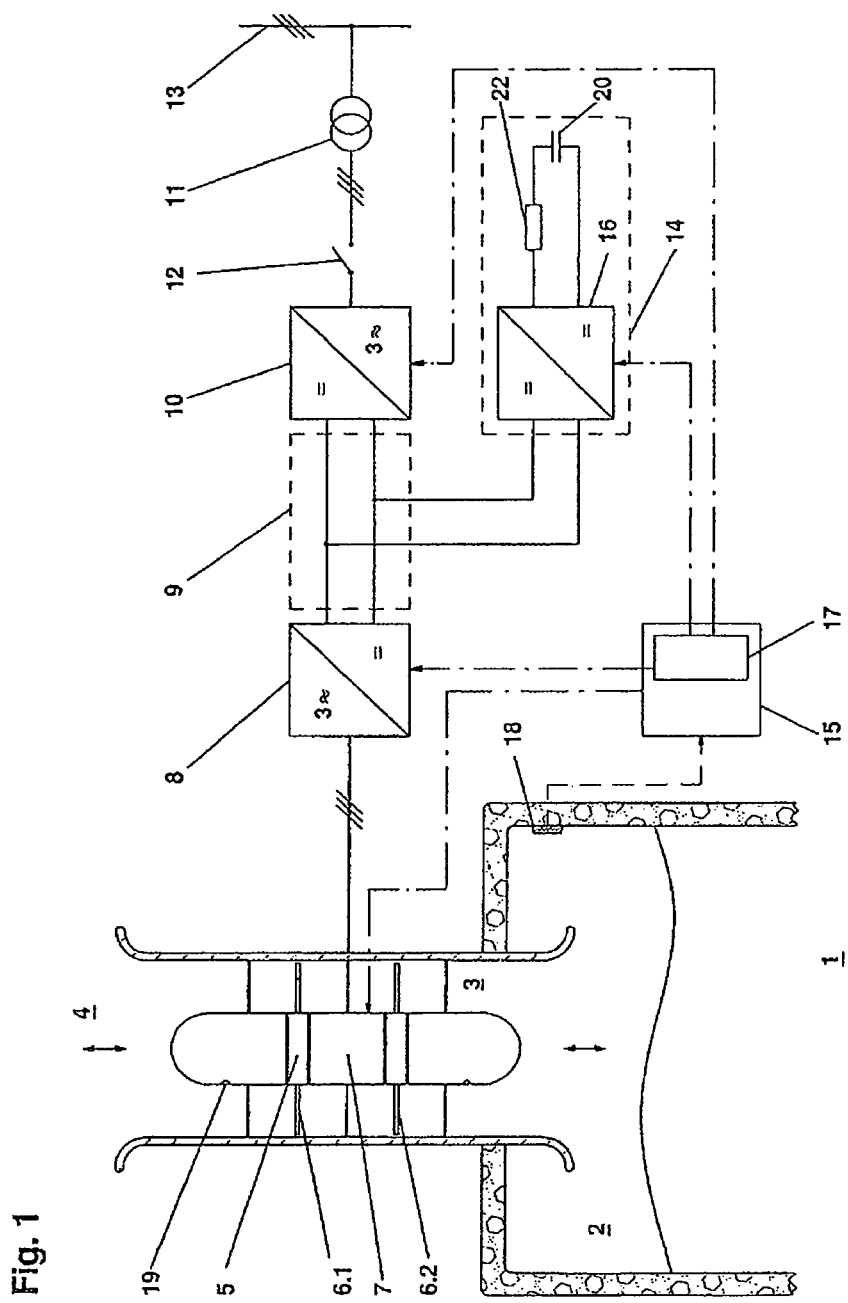
FIG. 1 shows a simplified diagram of a OWC-wave power plant with a device according to the invention for guiding the speed of an air turbine as well as a connection to a power grid via a direct current link with an energy storage.

FIG. 1 is a simplified diagram of an OWC-wave power plant with a wave chamber 2, wherein an air volume is enclosed above the water surface moving up and down with the cycle of the waves. The pressure fluctuations of this air volume causes an oscillating flow in a flow channel 3 outgoing from the wave chamber 2 and emerging to the exterior 4. An air turbine 5 is arranged in this flow channel. In this instance, a two-stage Wells turbine with the runners 6.1, 6.2 and an electrical generator 7, arranged there between and being driven by the runners 6.1, 6.2, is utilised. A Wells turbine is a preferred example of an air turbine rotating in a single direction and receiving an incident flow from opposite directions. It comprises turbine blades, which are arranged in the plane of rotation of the corresponding runner 6.1, 6.2 and present a drop-shaped profile. Furthermore, active or passive blade angle adjustment mechanisms are known for Wells turbines for enabling a certain pitch angle of the turbine blades during operation with respect to the plane of rotation.

For enhancing the speed guidance provided by the invention for operating the air turbine under optimum conditions, i.e. as close as possible to the ideal flow coefficient, the rotating section of the air turbine 5 and of the electrical generator 7 is designed with low moment of inertia. To do so, lightweight building materials and composite structures should be taken into consideration for achieving a hollow construction, in particular for abaxial rotating parts.

According to the schematic illustration on FIG. 1, a device for speed guidance is used, which processes sensor data, characterising the flow in the flow channel 3. A pressure sensor 18 in the wave chamber 2 and a flow velocity measuring device 19 in the flow channel 3 are illustrated by way of example. Moreover, an embodiment may be envisioned, wherein the speed guidance device 15 processes the actual electrical power data of the electrical generator 7 to estimate the incident flow received by the air turbine 5 on the basis of a model. Besides, the application of indirect sensors, for instance acoustic sensors, can be envisioned.

For adapting the dynamic of the mechanical power pick-up by the air turbine 5 to the dynamic of the pneumatic system, the braking torque generated by the electrical generator 7 is adapted continuously during a flow oscillation period in the flow channel 3 in case of rigid coupling between the electrical generator 7 and the air turbine 5. This operation may comprise a characteristic-based open-loop control or a closed-loop control of the frequency inverter of the electrical generator, whereas asynchronous as well as synchronous generators can be applied. In this regard, for FIG. 1 it is assumed for the sake of simplicity that the generator side converter 8 of the direct current link 9 is bidirectional and that it is controlled by the speed guidance device 15 for adapting the braking torque of the electric generator.

The speed guidance of the air turbine 5 by tracking the braking torque of the electrical generator 7 presumes that the air turbine accelerates or decelerates sufficiently fast, if there is a difference between the braking torque of the electrical generator and the mechanical torque, which the runner picks up. In this context, the system-inherent inertia may be taken into account for the speed guidance.

For a preferred further embodiment, the electrical generator 7 can be driven as a motor for fast acceleration of the air turbine 5 in case of an operating condition for which the flow coefficient exceeds a determined threshold value. For an asynchronous machine as electrical generator, the generator side converter 8 is controlled by the speed guidance device 15 to achieve a subsynchronous operation. For this purpose a controller 17 can be provided, which additionally controls the generator side converter 10 of the direct current link 9 as well as the energy storage 14, which is described below in further detail.

The optimum power speed guidance of the air turbine 5 adds to the pulsing power generation of the electrical generator 7. At the same time the generated voltage is of variable frequency. In a further measure according to the invention a direct current link 9 is provided, which is connected to the generator side converter 8 and the network side converter 10. Consequently, the network side converter 10 for the present exemplary embodiment feeds electric power into a power grid 13 via a contactor 12 and a transformer 11, being preferably substantially averaged for several minutes, wherein a sufficiently sized energy storage 14 is connected to the direct current link 9. For the illustrated embodiment, the energy storage 14 comprises a high-power capacitor 20 (Supercap). Thereby, several high-power capacitors arranged in series and/or in parallel are preferred.

FIG. 1 illustrates further schematically that an electrical energy storage 14 is connected to the direct current link 9 by means of a DC converter 16, so that the voltage on the high-power capacitor 20 and the impedance 22 are decoupled from those of the direct current link 9. Hereby, on the one hand the storage capacity of the high-power capacitor 20 can be improved and on the other hand the fluctuation range of the voltage of the direct current link 9 can be limited to simplify the operation of the generator side converter 8 and of the network side converter 10. Accordingly, signals for the closed-loop and/or open-loop control are provided to the generator side converter 8, the network side converter 10 and the DC converter 16 of the energy storage, via the controller 17, which, for the present preferred embodiment, is integrated in the speed guidance device 15.

Figure 2:
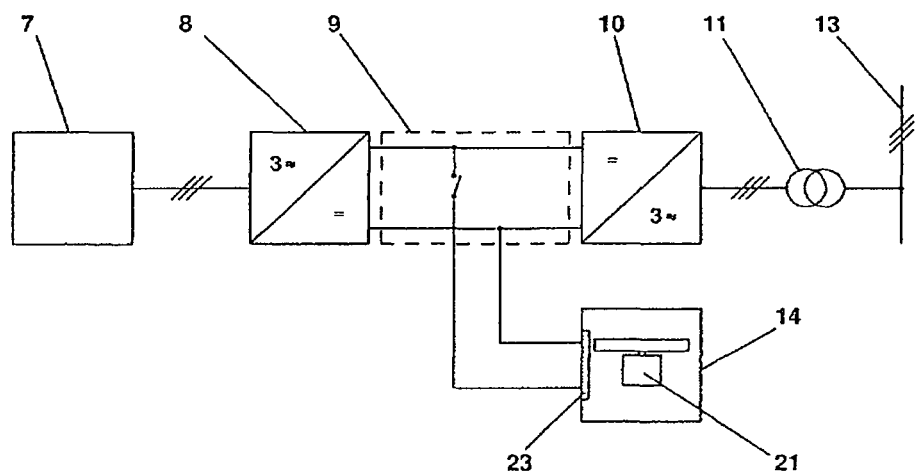
FIG. 2 shows an alternative embodiment for which an additional mechanical energy storage is connected to the direct current link.

FIG. 2 shows an alternative embodiment for the energy storage 14, wherein in addition to an electrical energy storage (not shown) a mechanical energy storage is provided in the form of a flywheel 21. Consequently, the power flow to and from the flywheel 21 is controlled or regulated via a control system 23 dedicated to the energy storage 14, having integrated power electronic components.

The energy storage 14, connected to the direct current link 9, is sized according to the invention in such a way that the power pulses of the energy production are not transmitted to the power grid 13. This means that the fluctuation range of the power feed during a flow oscillation period in the flow channel 3 is limited and additionally the typically pronounced stochastic fluctuations are averaged from one oscillation period to another. To do so, the averaging is performed in particular on a scale of several minutes, whereas preferably the averaging is conducted for more than 2 minutes and especially preferred for more than 3 minutes, wherein at the same time the maximum relatively power gradient with respect to the total installed rated power does not exceed 5%. For a total installed rated power of 20 kW of a small facility, this corresponds to a maximum relative power gradient of 1 kw/s. Preferably, an even smaller maximum relative power gradient of 2.5% is guaranteed, which means a maximum power gradient of 0.5 kw/s for a total installed rated power of 20 kW. For a medium time span for a flow oscillation period in the flow channel 3 in the range of several seconds, an efficient limitation of the power fluctuation bandwidth results. The same holds for wave power plants with large turbines, which are designed for a total installed rated power of about 300 kW for supplying approx. 200 households, whereas the energy storage used according to the invention should be scaled for that purpose, accordingly.

Additionally, should motorised operation of the electrical generator 7 prove necessary for the speed guidance of the air turbine, the necessary energy to do so should be taken from the energy storage 14. In such a case, energy will flow from the direct current link 9 to the electrical generator 7 via the generator side converter 8. The energy storage 14 then provides power compensation by a power input for maintaining the rated voltage in the direct current link 9.

The method according to the invention, respectively the wave power plant designed according to the invention, enables speed-guided and optimum power operation of the air turbine without unwanted reaction on the power grid connected thereto, based on an integrated energy storage. Embodiments of the invention can be contemplated in accordance with the subsequent claims.

List of Reference Numerals

1 Wave power plant
2 Wave chamber
3 Flow channel
4 Exterior
5 Air turbine
6.1, 6.2 Runner
7 Electrical generator
8 Generator side converter
9 Direct current link
10 Network side converter
11 Transformer
12 Contactor
13 Power grid
14 Energy storage
15 Speed guidance device
16 DC converter
17 Controller
18 Pressure sensor
19 Flow velocity measuring device
20 High-power capacitor
21 Flywheel
22 Impedance
23 Control device

The invention claimed is:

1. A method for operating a wave power plant, the method comprising:
generating an oscillating air current by a wave movement inside a wave chamber communicating with a flow channel leading to the exterior;
driving at least indirectly an electrical generator using an air turbine rotating in a single direction for an incident airflow coming from opposite directions, wherein said air turbine is arranged in the flow channel;
supplying, using the electrical generator, electrical power to a power grid, which is averaged over a plurality of flow oscillation periods using a generator side converter, a direct current link and a network side converter, wherein an electrical energy storage is connected to the direct current link using a DC converter; and
maintaining the voltage value of the direct current link between a lower limiting voltage and an upper limiting voltage by at least one of a closed-loop and an open-loop control of a power input and a power output;
wherein the air turbine is speed guided, depending on a variable, which characterises the flow in at least one of the flow channel and the pressure in the wave chamber, wherein the rotational speed is guided continuously during a flow oscillation period.

2. The method according to claim 1, characterised in that the speed of the air turbine is guided by a closed-loop or open-loop control of the braking torque of the electrical generator.

3. The method according to claim 1, characterised in that the speed guidance of the air turbine comprises motorised operation, for which electrical power is supplied from the direct current link to the electrical generator for accelerating the air turbine during motorised operation, which is at least partially compensated for by a power flow from the energy storage to the direct current link.

4. The method according to claim 2, characterised in that the speed guidance of the air turbine comprises motorised operation, for which electrical power is supplied from the direct current link to the electrical generator for accelerating the air turbine during motorised operation, which is at least partially compensated for by a power flow from the energy storage to the direct current link.

5. A wave power plant comprising:
- a wave chamber, which communicates with a flow channel leading to the exterior, wherein an oscillating air current is generated by a wave movement inside the wave chamber;
- an air turbine rotating in a single direction, for an incident airflow coming from opposite directions, wherein said air turbine is arranged in the flow channel and drives at least indirectly an electrical generator;
- a generator side converter, a direct current link and a network side converter are interposed between the electrical generator and a power grid, whereas an electrical energy storage is connected to the direct current link using a DC converter to supply electrical power averaged for several flow oscillation periods in the flow channel to the power grid; and
- a speed guidance device for the air turbine is provided, which processes a variable, characterising the flow in at least one of the flow channel and the pressure in the wave chamber for the speed guidance of the air turbine, wherein the rotational speed is guided continuously during a flow oscillation period.

6. A wave power plant according to claim 5, characterised in that the energy storage additionally comprises a flywheel.

7. A wave power plant according to claim 5, characterised in that the energy storage comprises a high-power capacitor.

8. A wave power plant according claim 5, characterised in that a controller is dedicated to the generator side converter, the network side converter and the DC converter.

9. A wave power plant according claim 6, characterised in that a controller is dedicated to the generator side converter, the network side converter and the DC converter.

10. A wave power plant. according claim 7, characterised in that a controller is dedicated to the generator side converter; the network side converter and the DC converter.

* * * * *